(12) United States Patent
Tabor et al.

(10) Patent No.: US 6,720,385 B2
(45) Date of Patent: Apr. 13, 2004

(54) POLYURETHANE LATEXES, PROCESSES FOR PREPARING THEM AND POLYMERS PREPARED THEREWITH

(75) Inventors: Rick L. Tabor, Gurnee, IL (US); Douglas R. Moore, Clute, TX (US); James J. Jakubowski, Midland, TX (US); Wayne R. Willkomm, Erie, CO (US); Ruben Solis, Richwood, TX (US)

(73) Assignee: The Dow Chemical Company, Midland, MI (US)

( * ) Notice: Subject to any disclaimer, the term of this patent is extended or adjusted under 35 U.S.C. 154(b) by 0 days.

(21) Appl. No.: 10/135,726

(22) Filed: Apr. 30, 2002

(65) Prior Publication Data

US 2002/0165314 A1 Nov. 7, 2002

Related U.S. Application Data

(63) Continuation of application No. 09/932,131, filed on Aug. 17, 2001, now abandoned, which is a continuation of application No. 09/039,976, filed on Mar. 16, 1998, now abandoned.
(60) Provisional application No. 60/041,600, filed on Mar. 17, 1997.

(51) Int. Cl.$^7$ .............. C08J 3/00; C08K 3/20; C08L 75/00
(52) U.S. Cl. .............. 524/591; 524/807; 524/839; 524/840
(58) Field of Search .............. 524/591, 839, 524/840, 807

(56) References Cited

U.S. PATENT DOCUMENTS

| | | | |
|---|---|---|---|
| 2,968,575 A | 1/1961 | Mallonee ............... 106/287 |
| 3,148,173 A | * 9/1964 | Axelrood |
| 3,178,310 A | 4/1965 | Berger et al. ........... 117/142 |
| 3,210,302 A | 10/1965 | Bowell et al. ........... 260/18 |
| 3,294,724 A | 12/1966 | Axelrood ............... 260/29.2 |
| 3,360,599 A | 12/1967 | Nyberg et al. ........... 264/216 |
| 3,401,133 A | 9/1968 | Grace et al. ........... 260/29.2 |
| 3,410,817 A | 11/1968 | McClellan et al. ....... 260/29.2 |
| 3,437,624 A | * 4/1969 | Dawn et al. |
| 3,488,272 A | 1/1970 | Frisch et al. ........... 204/181 |
| 3,503,917 A | 3/1970 | Burke ................. 260/29.6 |
| 3,563,943 A | 2/1971 | Davis et al. ........... 260/29.2 |
| 3,826,768 A | 7/1974 | Suzuki et al. ........ 260/29.2 TN |
| 3,905,929 A | 9/1975 | Noll |
| 3,919,173 A | 11/1975 | Coyner et al. ........ 260/77.5 AT |
| 3,997,592 A | 12/1976 | Aufdermarsh, Jr. ..... 260/471 C |
| 4,046,729 A | 9/1977 | Scriven et al. ........ 260/29.2 TN |
| 4,066,591 A | 1/1978 | Scriven et al. ........ 260/29.2 TN |
| 4,119,602 A | 10/1978 | Isgur et al. .......... 260/29.6 NR |
| 4,123,403 A | 10/1978 | Warner et al. ........ 260/29.2 EP |
| 4,147,679 A | 4/1979 | Scriven et al. ........ 260/29.2 TN |
| 4,292,226 A | 9/1981 | Wenzel et al. ........ 260/29.2 TN |
| 4,374,209 A | 2/1983 | Rowlands ............... 521/116 |
| 4,431,763 A | 2/1984 | Reed .................. 524/389 |
| 4,433,095 A | 2/1984 | Hombach et al. ........ 524/563 |
| 4,442,259 A | 4/1984 | Isgur et al. .......... 524/839 |
| 4,444,976 A | 4/1984 | Rabito ................. 528/60 |
| 4,501,852 A | 2/1985 | Markusch et al. ....... 524/591 |
| 4,507,413 A | 3/1985 | Thoma et al. ........... 524/42 |
| 4,540,633 A | 9/1985 | Kucera et al. ......... 428/423.1 |
| 4,558,090 A | 12/1985 | Drexler et al. ......... 524/591 |
| 4,742,095 A | 5/1988 | Markusch et al. ....... 523/322 |
| 5,037,864 A | 8/1991 | Anand et al. ........... 523/348 |
| 5,043,381 A | 8/1991 | Coogan et al. ......... 524/591 |
| 5,071,904 A | 12/1991 | Martin et al. ......... 524/458 |
| 5,185,200 A | 2/1993 | Tirpak et al. ......... 428/288 |
| 5,227,422 A | 7/1993 | Mitsuji et al. ........ 524/457 |
| 5,281,655 A | 1/1994 | Mitsuji et al. ........ 524/507 |
| 5,364,573 A | 11/1994 | Noky ................. 264/40.1 |
| 5,494,960 A | 2/1996 | Rolando et al. ........ 524/591 |
| 5,539,021 A | 7/1996 | Pate et al. ........... 523/335 |
| 5,569,706 A | * 10/1996 | Jacobs et al. |
| 5,576,382 A | 11/1996 | Seneker et al. ........ 524/591 |
| 5,589,563 A | 12/1996 | Ward et al. ........... 528/44 |

FOREIGN PATENT DOCUMENTS

| | | | | |
|---|---|---|---|---|
| DE | 197 08 451 A1 | 9/1998 | ........ | C08L/75/04 |
| EP | 0 167 188 A1 | 1/1986 | ........ | C08F/283/00 |
| EP | 0 279 198 A | 8/1988 | ........ | C08G/18/10 |
| EP | 0 741 152 A1 | 11/1996 | ........ | C08G/18/08 |
| GB | 1243604 | 8/1971 | ........ | C08G/22/04 |
| GB | 1432112 | 4/1976 | ........ | C08G/18/10 |
| GB | 1 432 112 | 4/1976 | ........ | C08G/18/10 |
| GB | 2316948 A | 3/1998 | ........ | C08G/18/66 |
| JP | 49047427 A | 5/1974 | ........ | C08G/18/12 |
| JP | 55052359 | 4/1980 | ........ | C09D/3/58 |
| JP | 02204032 | 8/1990 | ........ | B32B/27/08 |
| JP | 05005094 | 1/1993 | ........ | C09K/3/16 |
| JP | 09165425 | 6/1997 | ........ | C08F/299/06 |
| WO | 95/08583 | 3/1995 | ........ | C08G/18/46 |
| WO | 96/08352 | 3/1996 | ........ | B28B/1/38 |

OTHER PUBLICATIONS

Saunders et al., "Polyurethanes, Part I. III Polyethers," Polyurethane, Chemistry and Technology, vol. 1, pp. 32–42 and 44–54 (1962).

Saunders et al., "Flexible Foams, Part VII. 2. Polyols," Polyurethane, Chemistry and Technology, vol. 2, pp. 5–6 and 198–199 (1964).

Saunders, "Organic Polymer Chemistry," pp. 323–325 (1973).

Buist, ed. "Developments in Polyurethanes," vol. 1, pp. 1–76 (1978).

"Standard Test Methods for Polyurethane Raw Materials: Determination of Unsaturation of Polyos." The American Society for Testing and Materials D4671–99.

* cited by examiner

*Primary Examiner*—Patrick D. Niland

(57) ABSTRACT

Disclosed are stable aqueous polyurethane latexes prepared from prepolymer formulations including a polyisocyanate component and polyol component, wherein from 5 to 40 percent of the weight of the polyol component is ethylene oxide in the form of ethylene oxide applied as an end cap onto a propylene oxide or higher oxyalkylene polyoxyalkylene polyol, and no more than 45 percent of the weight of polyol component is ethylene oxide. These latexes are prepared without the use of organic solvents.

20 Claims, No Drawings

POLYURETHANE LATEXES, PROCESSES FOR PREPARING THEM AND POLYMERS PREPARED THEREWITH

BACKGROUND OF THE INVENTION

This Application is a continuation of U.S. application Ser. No. 09/932,131, filed Aug. 17, 2001, now abandoned, which is a continuation of U.S. application Ser. No. 09/039,976, filed Mar. 16, 1998, now abandoned, which claims the benefit of U.S. Provisional Application Ser. No. 60/041,600, filed Mar. 17, 1997.

This invention relates to polyurethane latexes, processes for preparing them and polymers prepared therewith. This invention particularly relates to stable polyurethane polymer latexes.

Latex polymers are known to be useful in many applications such as paints, sealants, and films. Polyurethane latexes are less widely used due to inherent difficulties in preparing stable aqueous polyurethane latexes. For example, polyurethane formulation components, such as polyisocyanates can be reactive with water. Polyurethane prepolymers useful for forming latexes are often not low viscosity liquids at ambient conditions. These and other properties can cause polyurethane latexes to be unstable, that is to form a dispersion which separates from the continuous aqueous phase of the latex, which is often not desirable in an industrial venue.

One solution to at least some of the problems of preparing polyurethane latexes is to use a solvent/water based process wherein the solvent is optionally removed prior to use in the final application. For example, a polyurethane can be prepared by processes such as: 1) dissolving a polyurethane in an organic solvent, 2) emulsifying the solution in water, and 3) removing the solvent. Such processes are disclosed in U.S. Pat. Nos. 3,360,599; 3,503,917; 4,123,403; and 5,037,864. Unfortunately, processes to remove solvent are often not completely efficient and leave behind traces of solvents in the latex to be later released in latex applications, also solvent removal is an added cost.

In other situations unstable latexes are tolerated. A polyurethane latex which is described as being useful for preparing films is disclosed in GB 1 432 112. Therein, a latex is prepared which is allowed to separate into a thixotropic layer and a "serum" wherein the thixotropic layer has a solids concentration of about 30 to 50 percent.

It would be desirable in the art to prepare polyurethane latexes which are stable. It would also be desirable in the art to prepare polyurethane latexes which are stable without resort to the use of organic solvents, such as toluene, acetone, and the like.

SUMMARY OF THE INVENTION

In one aspect, the present invention is a process for preparing a stable polyurethane latex comprising admixing a polyurethane prepolymer with water, a surfactant, and a chain extender under conditions sufficient to disperse the prepolymer and chain extender reaction product to form a latex wherein: (i) the prepolymer is prepared from a prepolymer formulation including a polyisocyanate component and polyol component, (ii) from 5 to 40 percent of the weight of the polyol component is ethylene oxide in the form of ethylene oxide applied as an end cap onto a propylene oxide or higher oxyalkylene polyoxyalkylene polyol, and (iii) no more than 45 percent of the weight of polyol component is ethylene oxide.

In another aspect, the present invention is a stable polyurethane latex prepared by a process for preparing a stable polyurethane latex comprising admixing a polyurethane prepolymer with water, a surfactant, and a chain extender under conditions sufficient to disperse the prepolymer and chain extender reaction product to form a latex wherein: (i) the prepolymer is prepared from a prepolymer formulation including a polyisocyanate component and polyol component, (ii) from 5 to 40 percent of the weight of the polyol component is ethylene oxide in the form of ethylene oxide applied as an end cap onto a propylene oxide or higher oxyalkylene polyoxyalkylene polyol, and (iii) no more than 45 percent of the weight of polyol component is ethylene oxide.

In yet another aspect, the present invention is a polyurethane polymer coated substrate prepared by a process comprising the steps of (1) admixing a polyurethane prepolymer with water, a surfactant, and a chain extender under conditions sufficient to disperse the prepolymer and chain extender reaction product to form a latex wherein: (i) the prepolymer is prepared from a prepolymer formulation including a polyisocyanate component and polyol component, (ii) from 5 to 40 percent of the weight of the polyol component is ethylene oxide in the form of ethylene oxide applied as an end cap onto a propylene oxide or higher oxyalkylene polyoxyalkylene polyol, and (iii) no more than 45 percent of the weight of polyol component is ethylene oxide, (2) applying the latex to a substrate, and (3) dehydrating the latex to form a coating.

Another aspect of the present invention is a stable polyurethane latex containing no organic solvents comprising: (1) a continuous aqueous phase; and dispersed therein: (2) from about 0.1 to about 10.0 percent by weight of an anionic surfactant; and (3) a polymer comprising the reaction product of:(i) an ethylene oxide capped poly(propylene oxide) polyol component having a molecular weight of from about 1500 to about 6000 wherein from 5 to 40 percent by weight of the polyol component is ethylene oxide, (ii) a polyether monol having an ethylene oxide content of greater than 40% by weight, (iii) a diol having a molecular weight of from about 30 to 500, (iv) an aromatic polyisocyanate, and (v) a diamine, water, or combination thereof.

DESCRIPTION OF THE PREFERRED EMBODIMENTS

In one embodiment of the present invention, a polyurethane latex is formed. For the purposes of the present invention, the term "polyurethane" is defined to include the compounds known in the art as "polyureas" The terms polyurea and polyurethane are well known in the art of preparing polymers, but for clarity, these terms are defined as follows. A "polyurethane" is a polymer having a structure similar to that of a polymer prepared by reacting a polyisocyanate and a poly-alcohol. A "polyurea" is a polymer having a structure similar to that of a polymer prepared by reacting a polyisocyanate with a polyamine. It is further recognized in the art of preparing polyurethanes that either material can have some linkages other than the named primary linkage. For example, a polyurethane prepared using a base polyol but also an amine chain extender would have some urea linkages but would still be a polyurethane. Likewise a polyurea prepared using a base polyamine but also using a glycol chain extender would have some urethane linkages but would still be a polyurea, but may be referred to herein also as a polyurethane.

The polymers of the present invention are prepared by applying a latex to a substrate. The latex can be applied by means of painting or spraying. For purposes of the present invention, painting is defined as applying a material, such as a polyurethane latex, to a brush or other applicator, and then depositing the polyurethane latex on a substrate, or, in alternative, the material can be puddled or pooled on a substrate and then spread over the substrate using a brush or other spreading means. Also for the purposes of the present invention, spraying is defined as applying a material, such as a polyurethane latex, by atomizing the material and ejecting the atomized material onto the substrate.

Another process useful with the present invention for applying a polyurethane latex to a substrate is dipping. In a dipping process, a substrate is lowered into a pool of latex and then removed. The latex which is retained on the substrate can be allowed to dry as is or can be further spread to make a more even application. Parts of the substrate can be masked to avoid getting polyurethane latex on the entire surface of the dipped substrate.

Still another process for applying a latex to substrate useful with the present invention is application by means of a transfer process. In a transfer process, a polyurethane latex is applied to a material which has very little ability to adhere to the polymer which forms upon dehydration. This "transfer" material is brought into contact with another substrate which has a higher adhesive affinity for the polymer. The transfer material is removed and the polymer is retained on the substrate. While the above processes for applying a latex to a substrate are preferred, any process known to be useful to one of ordinary skill in the art for applying a polyurethane latex to a substrate can be used with the present invention.

An advantage of using latex systems to prepare polymers is the simplicity of using latexes. In contrast, using A+B systems (that is, systems wherein a polyisocyanate is reacted with a polyol to prepare a polyurethane) can be demanding, requiring considerable expertise to prepare articles in a safe and economical fashion. Since an A+B system has a reaction profile, the process for preparing an article of manufacture with an A+B system will often include steps that permit the forming polymer to react for a time sufficient and under conditions suitable to prepare a polymer with the properties requisite for the intended application.

In a marked contrast to using an A+B system, in an application of the present invention, the polyurethane polymer is already fully formed in the latex. The polyurethane latex can be applied to a substrate and dried as quickly or as slowly as is desirable in the application and under conditions limited only by the tolerances of the polymer and substrate. Since the polyurethane polymer is fully formed, there is very little likelihood of a worker coming into contact with any reactive raw material.

Another advantage of the present invention over an A+B system is that the viscosity of a latex of the present invention is very easily adjusted. The common means of adjusting the viscosity of liquid systems, either varying the temperature or the solvent concentration of a system, is largely not available with an A+B polyurethane system. Since an A+B system has a reactivity profile, anything done to adjust the viscosity of the system, such as increasing the temperature, could cause the polymer to form prematurely, for example inside a mixing head, with undesired results. Likewise, adding a solvent to a polyurethane formulation will likely cause a change to the physical properties of any polymer prepared therewith. With a polyurethane latex of the present invention, latex temperatures and latex solids concentrations can be varied to adjust the latex's viscosity. Special additives such as thixotropes also can be added to latexes of the present invention.

After being applied, a polyurethane latex of the present invention is dried to produce a polymer. Any means of drying the polyurethane latex can be used which is known to be useful to those of ordinary skill in the art. For example, the polyurethane latex coating can be air dried at ambient conditions or it can be dried at elevated temperatures, optionally in reduced humidity or with forced air. The two considerations of choosing drying conditions for the present invention are 1) not to exceed the temperature tolerance of the polyurethane polymer or the support and 2) not to remove water from the latex so quickly that the film is interrupted due to bubbling unless a bubbled finished is desired. Any drying conditions, optionally with additional drying aids, such as forced air, which is known to be useful to those of ordinary skill in the art of coating substrates with polyurethane latexes can be used with the present invention.

In one embodiment, the polyurethane latexes of the present invention are prepared by emulsifying a prepolymer in a continuous aqueous phase and then admixing the prepolymer with a chain extender. In another embodiment, chain extension and water emulsification occur in a single step wherein the chain extender is also water. In either case there are two discernible formulations. One formulation is the prepolymer which has at least a polyisocyanate component and a polyol component. A second formulation is the latex formulation which includes at least a prepolymer and a chain extender.

In the process of the present invention, a polyurethane prepolymer formulation and a surfactant are emulsified with water. The surfactant can be present in an amount of from about 0.1 percent to about 10 percent of the solids content of the latex. Preferably, the surfactant is present at an amount of from about 1 to 5 percent of the solids content of the latex. The surfactant can be ionic or nonionic. If non-ionic preferably the surfactant is a an ethoxylated alcohol, ethoxylated fatty acid, sorbitan derivative, lanolin derivative, ethoxylated nonyl phenol or a alkoxylated polysiloxane. Preferably, the surfactant is an ionic surfactant which does not react significantly with isocyanate groups and most preferably the surfactant is an anionic surfactant. Suitable classes of surfactants include, but are not restricted to sulfates of ethoxylated phenols such as poly(oxy-1,2-ethanediyl)alpha-(nonylphenyl)omega-hydroxy-sulfate ammonium salt; alkali metal fatty acid salts such as alkali metal oleates and stearates; alkali metal lauryl sulfates, quaternary ammonium surfactants; alkali metal alkylbenzene sulfonates such as branched and linear sodium dodecylbenzene sulfonates; anionic fluorocarbon surfactants such as alkali metal perfluoroalkyl sulfonates; dodecyl benzene sulfonic acid trialkyl amine salts; dodecyl benzene sulfonic acid ammonium salts; trialkanol amine lauryl sulfates; ammonium lauryl sulfates; trialkyl amine lauryl sulfates; ammonium lauryl sulfonates; alkali metal lauryl sulfonates; trialkanol amine lauryl sulfonates; trialkyl amine lauryl sulfonates; lauryl dimethyl amine oxide; dodecyl diphenyl oxide di(sulfonic acid) alkali metal salt; dodecyl diphenyl oxide di(sulfonic acid) trialkanol amine salts; dodecyl diphenyl oxide di(sulfonic acid) trialkyl amine salts; dodecyl diphenyl oxide di(sulfonic acid) ammonium salts; alkyl phenol polyethoxylate; polyoxyethylene/polyoxypropylene block copolymers; polyoxyethylene/polyoxybutylene block copolymers; and alkali metal soaps of modified resins. Particularly preferred surfactants are dodecyl benzene sulfonic acid trialkanol amine salt, dodecyl benzene sulfonic acid triethanol amine salt, dodecyl benzene sulfonic acid sodium salt; and triethanol amine laurylsulfate.

The polyurethane latexes of the present invention are prepared using polyurethane formulations which include a polyisocyanate component and an isocyanate reactive component also known as an active hydrogen containing material or polyol. The term "polyurethane" is not limited to those polymers which include only polyurethane linkages. It is well understood by those of ordinary skill in the art of preparing polyurethanes that polyurethanes also includes polymers containing allophanate, biuret, carbodiimide, oxazolinyl, isocyanurate, uretidinedione, urea, and other linkages in addition to urethane. Similarly, polyureas too can have such linkages.

A polyurethane prepolymer useful with the present invention can be an isocyanate terminated prepolymer. The polymer of a latex formed by admixing a prepolymer with a chain extender and water can be an isocyanate terminated polymer, an active hydrogen terminated polymer, or the reaction product of an admixture of a polyisocyanate and a polyisocyanate reactive component and chain extender at near stoichiometric concentrations. The prepolymer can be formed by reacting the components of a prepolymer formulation including a polyisocyanate component and an active hydrogen component. The latex is formed by reacting a prepolymer and a chain extender in a continuous aqueous phase. The prepolymer may, optionally, be formulated to react wherein the water of the continuous aqueous phase is a minor, major, or the exclusive chain extender.

The polyisocyanate component of the prepolymer formulations of the present invention can be advantageously selected from organic polyisocyanates, modified polyisocyanates, isocyanate-based prepolymers, and mixtures thereof. These can include aliphatic and cycloaliphatic isocyanates, but aromatic and especially multifunctional aromatic isocyanates are preferred. Preferred polyisocyanates are 2,4- and 2,6-toluenediisocyanate and the corresponding isomeric mixtures; 4,4'-, 2,4'- and 2,2'-diphenylmethanediisocyanate and the corresponding isomeric mixtures; mixtures of 4,4'-, 2,4'- and 2,2'-diphenylmethanediisocyanates and polyphenyl polymethylene polyisocyanates PMDI; and mixtures of PMDI and toluene diisocyanates. Also useful for preparing the polyurethanes of the present invention are aliphatic and cycloaliphatic isocyanate compounds such as 1,6-hexamethylene-diisocyanate; 1-isocyanato-3,5,5-trimethyl-1-3-isocyanatomethyl-cyclohexane; 2,4- and 2,6-hexahydrotoluene-diisocyanate, as well as the corresponding isomeric mixtures; 4,4'-, 2,2'- and 2,4'-dicyclohexylmethanediisocyanate, as well as the corresponding isomeric mixtures. 1,3 Tetramethylene xylene diisocyanate can also be used with the present invention.

Also advantageously used for the polyisocyanate component of the formulations of the present invention are the so-called modified multifunctional isocyanates, i.e., products which are obtained through chemical reactions of the above diisocyanates and/or polyisocyanates. Exemplary are polyisocyanates containing esters, ureas, biurets, allophanates and preferably carbodiimides and/or uretonimines; isocyanurate and/or urethane group containing diisocyanates or polyisocyanates. Liquid polyisocyanates containing carbodiimide groups, uretonimine groups and/or isocyanurate rings, having isocyanate groups (NCO) contents of from about 10 to about 40 weight percent, more preferably from about 20 to about 35 weight percent, can also be used. These include, for example, polyisocyanates based on 4,4'-, 2,4'- and/or 2,2'-diphenylmethane diisocyanate and the corresponding isomeric mixtures, 2,4- and/or 2,6-toluenediisocyanate and the corresponding isomeric mixtures; mixtures of diphenylmethane diisocyanates and PMDI and mixtures of toluenediisocyanates and PMDI and/or diphenylmethane diisocyanates.

Suitable prepolymers for use as the polyisocyanate component of the prepolymer formulations of the present invention are prepolymers having NCO contents of from about 2 to about 40 weight percent, more preferably from about 4 to about 30 weight percent. These prepolymers are prepared by reaction of the di- and/or poly-isocyanates with materials including lower molecular weight diols, triols, but also they can be prepared with multivalent active hydrogen compounds such as di- and tri-amines and di- and tri-thiols. Individual examples are aromatic polyisocyanates containing urethane groups, preferably having NCO contents of from about 5 to about 40 weight percent, more preferably about 20 to about 35 weight percent, obtained by reaction of diisocyanates and/or polyisocyanates with, for example, lower molecular weight diols, triols, oxyalkylene glycols, dioxyalkylene glycols or polyoxyalkylene glycols having molecular weights up to about 800. These polyols can be employed individually or in mixtures as di- and/or polyoxyalkylene glycols. For example, diethylene glycols, dipropylene glycols, polyoxyethylene glycols, ethylene glycols, propylene glycols, butylene glycols, polyoxypropylene glycols and polyoxypropylenepolyoxyethylene glycols can be used. Polyester polyols can also be used as well as alkyl diols such as butane diol. Other diols also useful include bishydroxyethyl- or bishydroxypropyl-bisphenol A, cyclohexane dimethanol, and even bishydroxyethyl hydroquinone.

Particularly useful as the polyisocyanate component of the prepolymer formulations of the present invention are: (i) polyisocyanates having an NCO content of from 8 to 40 weight percent containing carbodiimide groups and/or urethane groups, from 4,4'-diphenylmethane diisocyanate or a mixture of 4,4'- and 2,4'-diphenylmethane diisocyanates; (ii) prepolymers containing NCO groups, having an NCO content of from about 2 to about 35 weight percent, based on the weight of the prepolymer, prepared by the reaction of polyols, having a functionality of preferably from 1.75 to 4 and a molecular weight of from about 800 to about 15,000 with 4,4'-diphenylmethane diisocyanate or with a mixture of 4,4'- and 2,4'-diphenylmethane diisocyanates and mixtures of (i) and (ii); and (iii) 2,4- and 2,6-toluene-diisocyanate and the corresponding isomeric mixtures. PMDI in any of its forms can also be used and is preferred. In this case it preferably has an equivalent weight between about 125 and about 300, more preferably from about 130 to about 175, and an average functionality of greater than about 1.5. More preferred is an average functionality of from about 1.75 to about 3.5. The viscosity of the polyisocyanate component is preferably from about 25 to about 5,000 centipoise (cPs) (0.025 to about 5 Pa·s), but values from about 100 to about 1,000 cPs at 25° C. (0.1 to 1 Pa·s) are preferred for ease of processing. Similar viscosities are preferred where alternative polyisocyanate components are selected. Still, preferably, the polyisocyanate component of the formulations of the present invention is selected from the group consisting of MDI, PMDI, an MDI prepolymer, a PMDI prepolymer, a modified MDI and mixtures thereof.

The prepolymer formulations of the present invention include a polyol component. Polyfunctional active hydrogen containing materials useful with the present invention can include materials other than those already described hereinabove. Active hydrogen terminated prepolymers useful with the present invention include active hydrogen adjuncts of the polyisocyanates and polyisocyanate terminated prepolymers described hereinabove. Active hydrogen containing compounds most commonly used in polyurethane production are those compounds having at least two hydroxyl groups or amine groups. Those compounds are referred to herein as polyols. Representatives of suitable polyols are generally known and are described in such publications as *High Polymers*, Vol. XVI, "Polyurethanes, Chemistry and Technology" by Saunders and Frisch, Interscience Publishers, New York, Vol. I, pp. 32–42, 44–54 (1962) and Vol. II, pp. 5–6, 198–199 (1964); *Organic Polymer Chemistry* by K. J. Saunders, Chapman and Hall, London, pp. 323–325 (1973); and *Developments in Polyurethanes*, Vol. I, J. M. Burst, ed., Applied Science Publishers, pp. 1–76 (1978). However, any active hydrogen containing compound can be used with the present invention. Examples of such materials include those selected from the following classes of compositions, alone or in admixture: (a) alkylene oxide adducts of polyhydroxyalkanes; (b) alkylene oxide adducts of non-reducing sugars and sugar derivatives; (c) alkylene oxide adducts of phosphorus and polyphosphorus acids; and (d) alkylene oxide adducts of polyphenols. Polyols of these types are referred to herein as "base polyols". Examples of alkylene oxide adducts of polyhydroxyalkanes useful herein are adducts of ethylene glycol, propylene glycol, 1,3-dihydroxypropane, 1,4-dihydroxybutane, and 1,6-dihydroxyhexane, glycerol, 1,2,4-trihydroxybutane, 1,2,6-trihydroxyhexane, 1,1,1-trimethylolethane, 1,1,1-trimethylolpropane, pentaerythritol, polycaprolactone, xylitol, arabitol, sorbitol, mannitol, and the like. Preferred herein as alkylene oxide adducts of polyhydroxyalkanes are the propylene oxide adducts and ethylene oxide capped propylene oxide adducts of dihydroxy- and trihydroxyalkanes. Other useful alkylene oxide adducts include adducts of ethylene diamine, glycerin, piperazine, water, ammonia, 1,2,3,4-tetrahydroxy butane, fructose, sucrose, and the like.

Also preferred are poly(oxypropylene) glycols, triols, tetrols and hexols and any of these that are capped with ethylene oxide. These polyols also include poly(oxypropyleneoxyethylene)polyols. The oxyethylene content should preferably comprise less than about 80 weight percent of the total polyol weight and more preferably less than about 40 weight percent. The ethylene oxide, when used, can be incorporated in any way along the polymer chain, for example, as internal blocks, terminal blocks, or randomly distributed blocks, or any combination thereof.

Another class of polyols which can be used with the present invention are "copolymer polyols", which are base polyols containing stably dispersed polymers such as acrylonitrile-styrene copolymers. Production of these copolymer polyols can be from reaction mixtures comprising a variety of other materials, including, for example, catalysts such as azobisisobutyro-nitrile; copolymer polyol stabilizers; and chain transfer agents such as isopropanol.

Polyester polyols can be used to prepare the polyurethane latexes of the present invention. Polyester polyols are generally characterized by repeating ester units which can be aromatic or aliphatic and by the presence of terminal primary or secondary hydroxyl groups, but any polyester terminating in at least 2 active hydrogen groups can be used with the present invention. For example, the reaction product of the tranesterification of glycols with poly(ethylene terephthalate) can be used to prepare the latexes of the present invention.

Polyamines, amine-terminated polyethers, polymercaptans and other isocyanate-reactive compounds are also suitable in the present invention. Polyisocyanate polyaddition active hydrogen containing compounds (PIPA) can be used with the present invention. PIPA compounds are typically the reaction products of TDI and triethanolamine. A process for preparing PIPA compounds can be found in, for example, U.S. Pat. No. 4,374,209, issued to Rowlands.

In addition to polyisocyanates and active hydrogen containing compounds, the polyurethane formulation useful for preparing the polyurethane latexes of the present invention can include additional materials called additives. For example, formulations useful with the present invention can include fillers, thixotropic agents, surfactants, catalysts, dispersion aids, crosslinkers, and the like. Any additive known to be useful to one of ordinary skill in the art of preparing polyurethane latexes can be used with the present invention. The additives are preferably added to either the polyisocyanate or the polyol component of the prepolymer formulation, more preferably added to the polyol component, but can be added in any way useful in forming a polyurethane latex.

While any of the above recited compounds and materials can be used with the prepolymer formulations of the present invention, preferably the primary components of the formulations will include an aromatic polyisocyanate, more preferably MDI, TDI, PMDI or MDI or TDI prepolymers as the polyisocyanate component. Preferably, the polyol component will be a polyol, polyamine, mixture of polyols, or mixture of polyamines, wherein the polyol, polyamine, or the primary component of a mixture of polyols or polyamines is a polyether having an ethylene oxide content of from about 5 to about 45 percent and a molecular weight of from about 750 to about 8,000. From about 5 to about 40 percent of the weight of the polyol component is in the form of ethylene oxide end-capping.

End capping is the term applied to preparing a polyether polyol using high alkylene oxides, such as propylene oxide, and then in a second step applying ethylene oxide to the ends of the polyol. This provides advantages such as greater primary hydroxyl termination without the high hydrophilic properties of all ethylene oxide polyols. Such end capped polyols are required for the polyol component of the prepolymer formulations of the present invention.

The polyol component of the prepolymer formulations of the present invention can include the other polyols described hereinabove, as long as the limitations that the polyol component have an ethylene oxide content of from about 5 to about 45 percent, a molecular weight of from about 750 to about 8,000, and from about 5 to about 40 percent of the weight of the polyol component is ethylene oxide in the form of ethylene oxide end-capping are met. Preferably, any additional polyols are used in a minor amount. For example, a small amount of a polyester polyol could be added to an ethylene oxide end capped polyol and that admixture used as the polyol component of a prepolymer formulation of the present invention.

The stoichiometry of the prepolymer formulations of the present invention are such that a fully reacted combination of the polyisocyanate component and the polyol component (hereinafter prepolymer NCO content) will preferably have an NCO content of about 10 percent. Prepolymer formulations which have lower prepolymer NCO contents can be used, but the viscosity of the prepolymer will be higher which, in turn, can require more rigorous mixing for dispersal of the prepolymer in water. Prepolymer formulations which have higher prepolymer NCO contents can also be used, but increasing prepolymer NCO content can cause the polymer to coagulate rather than disperse in water. Preferably the prepolymer NCO contents of the prepolymers of the present invention is from about 6 to about 10 percent.

Additionally, it is necessary that the latex formulation include a chain extender. Any chain extender known to be useful to those of ordinary skill in the art of preparing polyurethanes can be used with the present invention. Such chain extenders typically have a molecular weight of about 30 to about 500 and have at least two active hydrogen containing groups. Polyamines are the most preferred chain extenders. Other materials, particularly water, can function to extend chain length and so are chain extenders for purposes of the present invention. It is particularly preferred that the chain extender be selected from the group consisting of amine terminated polyethers such as, for example, Jeffamine D-400 from Huntsman Chemical Company, amino ethyl piperazine, 2-methyl piperazine, 1,5-diamino-3-methyl-pentane, isophorone diamine, ethylene diamine, diethylene triamine, triethylene tetramine, triethylene pentamine, ethanol amine, lysine in any of its stereoisomeric forms and salts thereof, hexane diamine, hydrazine and piperazine. In the practice of the present invention, the chain extender is often used as solution of chain extender in water.

While, the chain extender of the present invention can be water, preferably it is a diamine. To the extent that a chain extender other than water is used in the formulations of the present invention, preferably it is used at an amount such that the equivalents of active hydrogens of the chain extender is less than about 90 percent of the isocyanate equivalents represented by the prepolymer NCO content. Even more preferably, the chain extender is present at an amount such that the equivalents of active hydrogens of the chain extender is from about 80 to about 90 percent of the isocyanate equivalents represented by the prepolymer NCO content.

The admixtures, emulsions and dispersions of the present invention are all prepared by admixing the liquid components of the prepolymer formulation and a continuous aqueous phase in the absence of an organic solvent such as toluene or acetone. A variety of mechanical mixing devices and equipment is commercially available for accomplishing such admixing. The effectiveness of admixing can be measured by the mean volume particle size of the resulting emulsion. A mean volume particle size of less than about 5 microns is an indication that adequate mixing has been accomplished. Most preferably, a mean volume particle size less than about 2.0 microns is desired for the practice of this invention. U.S. Pat. No. 5,539,021 to Pate disclosed one means of admixing a polyurethane latex useful with the present invention, but any means of admixing the prepolymer formulation components of the present invention which produces a latex having a particle size of less than about 5 microns can be used.

The latexes of the present invention can be prepared with additives included in the latex prepolymer formulations or in the latexes themselves. Any additive useful in a latex formulation or a polyurethane latex prepolymer formulation can be used with the present invention. For example, the latexes of the present invention can be prepared with flame retardant material. In one embodiment of the present invention, the latexes of the present invention include an inorganic filler. In another embodiment of the present invention, the latexes of the present invention are prepared with a monol as an additive in the latex prepolymer formulation.

Where a monol is included in the prepolymer formulation, the monol is preferably a mono-functional hydrophilic polyether having the general formula:

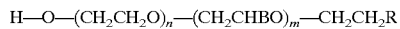

H—O—(CH$_2$CH$_2$O)$_n$—(CH$_2$CHBO)$_m$—CH$_2$CH$_2$R wherein R is a group is free of active hydrogens and which does not negate the hydrophilicity of the oxyethylene units;

B is an alkyl group having 1 to 8 carbon atoms; n is a number from 5 to 120; m is a number selected such that the weight ratio of oxyethylene units to other oxyalkylene groups is from 100:1 to 40:60. Preferably, R is a low molecular weight alkoxy group or an aliphatic carboxylic acid ester group of less than 24, preferably less than 20 carbons. The monols described above can be incorporated into the prepolymer as a means of modifying the properties of the latex and improving ease of emulsion formation. When present, the monol is present in amount of from 0.1 to about 15 weight percent of the prepolymer formulation, preferably from 2 to about 5 weight percent of the prepolymer formulation.

The following examples are provided to illustrate the present invention. The examples are not intended to limit the scope of the present invention and should not be so interpreted. Amounts are in weight parts or weight percentages unless otherwise indicated. Materials used in the examples are as defined below:

Polyol 1 is a 12 percent ethylene oxide (EO) capped propylene oxide (PO) diol having an equivalent weight of 1,000 g/eq.

Polyol 2 is an all PO diol having an equivalent weight of 1,000 g/eq.

Polyol 3 is a 15 percent EO capped, PO triol with an equivalent weight of 1,650 g/eq.

Polyol 4 is an 18 percent EO capped, PO triol with an equivalent weight of 1,617 g/eq.

Polyol 5 is a 30 percent EO capped, PO diol with an equivalent weight of 1,250 g/eq.

Monol 1 is a 950 molecular weight polyoxyethylene monol initiated from methanol.

The polyisocyanate is mixture of 50 percent 2,4'-MDI and 50 percent 4,4'-MDI.

Prepolymer A is prepared by admixing 640 g (0.396 eq.) Polyol 4 and 160 g (1.28 eq.) polyisocyanate at 90° C. for 2 hours resulting in a prepolymer having a polyisocyanate content of 20 percent.

Prepolymer B is prepared by admixing 640 g (0.388 eq.) Polyol 3 and 160 g (1.28 eq.) polyisocyanate at 90° C. for 2 hours resulting in a prepolymer having a polyisocyanate content of 20 percent.

Prepolymer C is prepared by admixing 94 part of Prepolymer A with 6 parts of polyisocyanate resulting in a Prepolymer having polyisocyanate content of 25 percent.

Prepolymer D is prepared by admixing 87.5 part of Prepolymer A with 12.5 parts of polyisocyanate resulting in a Prepolymer having polyisocyanate content of 30 percent.

Prepolymer E is prepared by admixing 540 g (0.327 eq.) Polyol 3 and 240 g (1.92 eq.) polyisocyanate at 90° C. for 2 hours resulting in a prepolymer having a polyisocyanate content of 31 percent.

Prepolymer F is prepared by admixing 480 g (0.48 eq.) Polyol 1 and 320 g (2.56 eq.) polyisocyanate at 90° C. for 2 hours resulting in a prepolymer having a polyisocyanate content of 40 percent.

Prepolymer G is prepared by admixing 544 g (0.544 eq.) Polyol 1 and 240 g (1.92 eq.) polyisocyanate at 90° C. for 2 hours resulting in a prepolymer having a polyisocyanate content of 31 percent.

Prepolymer H is prepared by admixing 480 g (0.384 eq.) Polyol 5 and 320 g (2.56 eq.) polyisocyanate at 90° C. for 2 hours resulting in a prepolymer having a polyisocyanate content of 40 percent.

Comparative Prepolymer I is prepared by admixing 560 g (0.560 eq.) Polyol 2 and 240 g (1.92 eq.) polyisocyanate at 90° C. for 2 hours resulting in a prepolymer having a polyisocyanate content of 30 percent.

Prepolymer J is prepared by admixing 560 g (0.560 eq.) Polyol 1 and 240 g (1.92 eq.) polyisocyanate at 90° C. for 2 hours resulting in a prepolymer having a polyisocyanate content of 30 percent.

Comparative Prepolymer K is prepared by admixing 560 g (0.448 eq.) Polyol 5 and 240 g (1.92 eq.) polyisocyanate at 90° C. for 2 hours resulting in a prepolymer having a polyisocyanate content of 30 percent.

Surfactant is sodium dodecyl benzene sulfonic acid surfactant sold under the trade designation RHODACAL DS-10, which is a trade designation of Rhone Poulenc.

Physical Property Testing is done according to ASTM D-1708.

EXAMPLE 1

120 g water and 45 g of a 20 percent by weight admixture of surfactant and water are placed in the mixing cup of a WARING BLENDER (WARING is a trade designation of WARING PRODUCTS DIVISION OF DYNAMICS CORPORATION OF AMERICA). Next, 75 g of Prepolymer B is added to the mixing cup and mixed at for 1 minute to form a prepolymer emulsion. Then, 12.7 g (0.08 eq.) of a 33 percent aqueous solution of 2-methyl piperazine is added into the emulsion by means of a syringe over a 30 second time period and stirring is continued for an additional 30 seconds to form a latex. The latex is then filtered through a paint filter and has a solids content of 35 percent. Part of the filtered latex is applied onto a clean glass plate and allowed to air dry under ambient conditions to form a thin elastomer film. Another portion of the latex is retained for observation. After 30 days, the latex is still stable with no observable indication of settling or separation into layers. The film and latex are tested for physical properties which are listed below in the Table.

EXAMPLE 2

A filtered latex is prepared substantially identically to Example 1 except that 189 g instead of 120 g of water, 36 g instead of 45 g of surfactant, Prepolymer A instead of Prepolymer B, and 2.49 g (0.042 eq.) of a 50 percent aqueous solution of ethylene diamine instead of 12.7 g (0.08 eq.) of a 33 percent aqueous solution of 2-methyl piperazine is used. Part of the filtered latex is applied onto a clean glass plate and allowed to air dry to form a thin elastomer film. Another portion of the latex is retained for observation. After 30 days, the latex is still stable with no observable indication of settling or separation into layers.

EXAMPLE 3

A filtered latex is prepared substantially identically to Example 1 except that Prepolymer C instead of Prepolymer B is used. Part of the filtered latex which has a solids content of 35 percent is applied onto a clean glass plate and allowed to air dry to form a thin elastomer film. Another portion of the latex is retained for observation. After 30 days, the latex is still stable with no observable indication of settling or separation into layers.

EXAMPLE 4

A filtered latex is prepared substantially identically to Example 1 except that Prepolymer D instead of Prepolymer B and 22.4 g (0.149 eq.) of a 33 percent aqueous solution of 2-methyl piperazine instead of 12.7 g (0.08 eq.) of a 33 percent aqueous solution of 2-methyl piperazine is used. Part of the filtered latex which has a solids content of 35 percent is applied onto a clean glass plate and allowed to air dry to form a thin elastomer film. Another portion of the latex is retained for observation. After 30 days, the latex is still stable with no observable indication of settling or separation into layers.

EXAMPLE 5

A filtered latex is prepared substantially identically to Example 1 except that Prepolymer E instead of Prepolymer B, 122.5 g instead of 120 g of water, 35 g instead of 45 g surfactant, and 22.4 g (0.149 eq.) of a 33 percent aqueous solution of 2-methyl piperazine instead of 12.7 g (0.08 eq.) of a 33 percent aqueous solution of 2-methyl piperazine is used. Part of the filtered latex which has a solids content of 35 percent is applied onto a clean glass plate and allowed to air dry to form a thin elastomer film. Another portion of the latex is retained for observation. After 30 days, the latex is still stable with no observable indication of settling or separation into layers.

EXAMPLE 6

A filtered latex is prepared substantially identically to Example 1 except that 25.5 g of a 33 percent piperazine solution (0.197 eq.) instead of 12.7 g (0.08 eq.) of a 33 percent aqueous solution of 2-methyl piperazine is used. Part of the filtered latex which has a solids content of 35 percent is applied onto a clean glass plate and allowed to air dry to form a thin elastomer film. Another portion of the latex is retained for observation. After 30 days, the latex is still stable with no observable indication of settling or separation into layers.

EXAMPLE 7

A filtered latex is prepared substantially identically to Example 1 except that 13.1 g of a 33 percent piperazine solution (0.101 eq.) instead of 12.7 g (0.08 eq.) of a 33 percent aqueous solution of 2-methyl piperazine is used. Part of the filtered latex which has a solids content of 35 percent is applied onto a clean glass plate and allowed to air dry to form a thin elastomer film. Another portion of the latex is retained for observation. After 30 days, the latex is still stable with no observable indication of settling or separation into layers. The film and latex are tested for physical properties which are listed below in the Table.

EXAMPLE 8

A filtered latex is prepared substantially identically to Example 1 except that Prepolymer H instead of Prepolymer B, 85 g instead of 120 g of water, 35 g instead of 45 g surfactant, and 55.7 g of a 15 percent piperazine solution (0.194 eq.) instead of 12.7 g (0.08 eq.) of a 33 percent aqueous solution of 2-methyl piperazine is used. Part of the filtered latex which has a solids content of 35 percent is applied onto a clean glass plate and allowed to air dry to form a thin elastomer film. Another portion of the latex is retained for observation. After 30 days, the latex is still stable with no observable indication of settling or separation into layers. The film and latex are tested for physical properties which are listed below in the Table.

Comparative Example 9

An attempt to prepare a filtered latex substantial identically to Example 1 is made except that Comparative Prepolymer I instead of Prepolymer B, and 15 g of a 33 percent piperazine solution (0.116 eq.) instead of 12.7 g (0.08 eq.) of a 33 percent aqueous solution of 2-methyl piperazine is used. During the addition of the chain extender, the dispersion coagulates and is unusable for further testing.

EXAMPLE 10

A filtered latex is prepared substantially identically to Example 1 except that Prepolymer J instead of Prepolymer B, and 15 g of a 33 percent piperazine solution (0.116 eq.) instead of 12.7 g (0.08 eq.) of a 33 percent aqueous solution of 2-methyl piperazine is used. Part of the filtered latex which has a solids content of 35 percent is applied onto a clean glass plate and allowed to air dry to form a thin elastomer film. Another portion of the latex is retained for observation. After 30 days, the latex is still stable with no observable indication of settling or separation into layers.

Comparative Example 11

An attempt to prepare a filtered latex substantially identical to Example 1 is made except that Comparative Prepolymer K instead of Prepolymer B, no surfactant, 135 g instead of 120 g water, and 17.9 g of a 33 percent piperazine solution (0.138 eq.) instead of 12.7 g (0.08 eq.) of a 33 percent aqueous solution of 2-methyl piperazine is used. During the addition of the chain extender, the dispersion coagulates and is unusable for further testing.

TABLE

|  | Example 1 | Example 7 | Example 8 |
|---|---|---|---|
| Tensile psi (kN/m$^2$) | 718 (4,950) | 2547 (16,940) | 3629 (25,201) |
| Elongation percent | 783 | 778 | 400 |
| Modulus psi (kN/m$^2$) | 357 (2,641) | 1314 (9,060) | 32240 (222,287) |
| Particle Size microns | <0.30 | 0.91 | 0.43 |

EXAMPLE 12

A prepolymer is prepared by admixing 633.5 g of Polyol 1, 20 g of Monol 1, 13.5 g of diethylene glycol, 333 g of the polyisocyanate and heating to 70 degrees C. for 15 hours. 75 grams of the prepolymer is weighed into an 8 oz glass bottle having an internal diameter of 5.6 cm. The bottle is clamped into place and an INDCO* mixing blade (4.3 cm diameter) is inserted into the prepolymer such that the blade was just covered by the liquid. (*INDCO is a trade designation of INDCO, INC). 26.5 g of water is then fed into the prepolymer at a rate of 12 g/minute for 2.25 min. A timer is initiated and stirring begun at a rate of 3000 rpm. At 30 seconds into the water feed, a surfactant (5.2 g of a 40% solution of the triethanol amine salt of lauryl sulfate in water) is introduced over a period of 5 seconds via syringe. After complete addition of the water, a solution of 10% piperazine in water (37.9 g) is added via syringe. The resulting 55.7% solids latex is then poured into a plastic tripour beaker, covered tightly with aluminum foil and allowed to stir gently overnight with a magnetic stirrer. The next day the latex is filtered through a coarse paint filter, diluted to 45% solids, cast onto polypropylene and allowed to dry under ambient conditions overnight. The resulting film is heated at 90° C. for 1 hour resulting in a film with the following tensile properties: 3318 psi (22,876 kN/m$^2$) ultimate tensile strength, 519% elongation, 1312 psi (9,045 kN m$^2$) Young's modulus. The filtered 55.7% solids latex has an average particle size of 0.7 microns.

EXAMPLE 13

A prepolymer is prepared by admixing 193.4 g of Polyol 1, 4.3 g of diethylene glycol, and 102.3 g of polyisocyanate and allowed to react for 16 hours at 75° C. The resultant prepolymer has a %NCO of 7.34 and a viscosity of 9300 cPs (9.3 Ns/m$^2$) at 25° C. and 40,000 cPs (40 Ns/m$^2$) at 7° C. A latex is prepared from the prepolymer by first admixing 12.6 of the surfactant and 50.4 g of water to form a 20% aqueous surfactant solution. Next, a blender is charged with the surfactant premix, 41.7 g of water, and 100 g of prepolymer and blended at maximum speed for 1 minute. Then a chain extender mix of 7.4 g of piperazine and 87.9 g of water is added dropwise over 30 seconds. The latex is transferred to a beaker and stirred until any froth present disappears. The resultant latex is filtered and tested for physical properties. The physical properties of the latex are: viscosity of 17 cPs (0.017 Ns/m$^2$) at 25° C., percent solids of 40.5, pH of 8.99, and a particle size of 0.78 microns. A film is prepared by pouring the latex into a aluminum mold and allowing to dry at ambient temperature overnight. The film is then heated at 90° C. for one hour. The physical properties of the film are tensile strength 5336 psi 36,790 (kN/m$^2$), % elongation of 653, stress@100% strain of 949 psi (6,543 kN m$^2$), tensile modulus of 6794 psi (46,843 kN/m$^2$), and a Tg of −38.7° C.

What is claimed is:

1. A process for preparing a stable polyurethane latex comprising admixing a polyurethane prepolymer with water, an anionic surfactant, and a chain extender in the absence of an organic solvent under conditions sufficient to disperse the prepolymer and chain extender reaction product to form a latex wherein:

(i) the prepolymer is prepared from a prepolymer formulation including an aromatic polyisocyanate component and polyol component, such that the NCO to OH ratio is about 3.2 to about 6.7 and the polyol component has a molecular weight from about 750 to about 8000, (ii) from 5 to 40 percent of the weight of the polyol component is ethylene oxide in the form of ethylene oxide applied as an end cap onto a propylene oxide or higher oxyalkylene polyoxyalkylene polyol, and (iii) no more than 45 percent of the weight of polyol component is ethylene oxide.

2. The process of claim 1 wherein the process is performed in two stages: a first stage of admixing a prepolymer with water and a surfactant to form an emulsion, and a second stage of admixing the emulsion with a chain extender.

3. The process of claim 1 wherein the chain extender is an amine.

4. The process of claim 3 wherein the amine is a diamine.

5. The process of claim 1 wherein the chain extender is water.

6. The process of claim 5 wherein the process is performed in one step.

7. The process of claim 1 wherein the polyol component includes an ethylene oxide capped polyoxypropylene diol having a molecular weight of from about 1500 to about 6000 and a polyether monol having an ethylene oxide content of greater than 40 percent.

8. The process of claim 7 wherein the polyol component includes a diol having a molecular weight of from about 30 to about 500.

9. A stable polyurethane latex prepared by the process of claim 1.

10. A polyurethane polymer coated substrate prepared by a process comprising the steps of:
(1) preparing a latex according the process of claim 1,
(2) applying the latex to a substrate, and
(3) dehydrating the latex.

11. A stable polyurethane latex comprising:
(1) a continuous aqueous phase; and
dispersed therein:
(2) from about 0.1 to about 10.0 percent by weight of a surfactant; and (3) a polymer comprising the reaction product of:
  (i) polyurethane prepolymer of a polyisocyanate component and polyol component wherein the polyisocyanate and polyol components have an NCO/OH ratio of about 3.2 to about 6.7, from 5 to 40 percent of the weight of the polyol component is ethylene oxide in the form of ethylene oxide applied as an end cap onto a propylene oxide or higher oxyalkylene polyoxyalkylene polyol, and no more than 45 percent of the weight of polyol component is ethylene oxide and
  (ii) a diamine, water, or combination thereof.

12. The dispersion of claim 11 wherein the polyol component has a molecular weight of about 1500 to about 6000.

13. The dispersion of claim 11 wherein the dispersion contains no organic solvents.

14. The dispersion of claim 11 wherein the polyisocyanate component is an aromatic polyisocyanate.

15. The dispersion of claim 14 wherein the aromatic polyisocyanate component is selected from the group consisting of 4,4'-, 2,4'- and 2,2'-diphenyl-methanediisocyanate and the corresponding isomeric mixtures; mixtures of 4,4'-, 2,4'- and 2,2'-diphenylmethanediisocyanates and polyphenyl polymethylene polyisocyanates PMDI; and mixtures of PMDI.

16. A stable polyurethane dispersion having no organic solvents comprising:
  (1) a continuous aqueous phase; and
  dispersed therein:
  (2) from about 0.1 to about 10.0 percent by weight of a surfactant; and
  (3) a polymer comprising the reaction product of:
    (i) polyurethane prepolymer of an aromatic polyisocyanate component and polyol component wherein the aromatic polyisocyanate and polyol components have an NCO/OH ratio of at least about 3.2 to about 6.7, from 5 to 40 percent of the weight of the polyol component is ethylene oxide in the form of ethylene oxide applied as an end cap onto a propylene oxide or higher oxyalkylene polyoxyalkylene polyol, and no more than 45 percent of the weight of polyol component is ethylene oxide, the MW of the polyol component is from about 750 to about 8000 and
    (ii) a diamine, water, or combination thereof.

17. The dispersion of claim 16 wherein the polyol component has a molecular weight of about 1500 to about 6000.

18. The dispersion of claim 16 wherein the aromatic polyisocyanate component is selected from the group consisting of 4,4'-, 2,4'- and 2,2'-diphenyl-methanediisocyanate and the corresponding isomeric mixtures; mixtures of 4,4'-, 2,4'- and 2,2'-diphenylmethanediisocyanates and polyphenyl polymethylene polyisocyanates PMDI; and mixtures of PMDI.

19. The process of claim 1 wherein the NCO to OH ratio of the prepolymer is at least 3.3.

20. The process of claim 1 wherein the aromatic polyisocyanate component is selected from the group consisting of 4,4'-, 2,4'- and 2,2'-diphenyl-methanediisocyanate and the corresponding isomeric mixtures; mixtures of 4,4'-, 2,4'- and 2,2'-diphenylmethanediisocyanates and polyphenyl polymethylene polyisocyanates PMDI; and mixtures of PMDI.

* * * * *